United States Patent
Frembgen (12)

(10) Patent No.: US 6,372,110 B1
(45) Date of Patent: Apr. 16, 2002

(54) ELECTROCHEMICAL PROCESSING OF SUBJECTS FLOWN THROUGH BY AN ELECTROLYTE

(76) Inventor: Fritz-Herbert Frembgen, Erfurter Str. 31, 87700 Memmingen (DE)

( * ) Notice: Subject to any disclaimer, the term of this patent is extended or adjusted under 35 U.S.C. 154(b) by 0 days.

(21) Appl. No.: 09/533,529

(22) Filed: Mar. 23, 2000

(30) Foreign Application Priority Data

Apr. 15, 1999 (DE) .......................... 199 17 043

(51) Int. Cl.[7] ............. C25D 5/00; C25D 5/02; B23H 3/00
(52) U.S. Cl. ............. 205/81; 205/118; 205/131; 205/641; 205/645
(58) Field of Search ................. 205/118, 131, 205/640–686, 81

(56) References Cited

U.S. PATENT DOCUMENTS 5,820,744 A * 10/1998 Edwards et al. ............ 205/640
5,865,977 A *  2/1999 Frembgen ................... 205/118

\* cited by examiner

*Primary Examiner*—Robert Dawson
*Assistant Examiner*—Michael J Feely
(74) *Attorney, Agent, or Firm*—Notaro & Michalos P.C.

(57) ABSTRACT

The electrochemical processing of a component such as an injection nozzle, must be calibrated in order to compare the throughput of the nozzle to a standard nozzle. Both throughput rates are determine at the same high pressure which is far above 100 bar. As a throughput medium, electrolyte is used in an ecm unit. From this a sufficient quantity is delivered into a temporarily pressure chamber in which another fluid has been supplied by a high pressure pump. A predetermined high pressure is built up which by way of a highly accurate control valve is maintained during the calibration procedure.

4 Claims, 1 Drawing Sheet

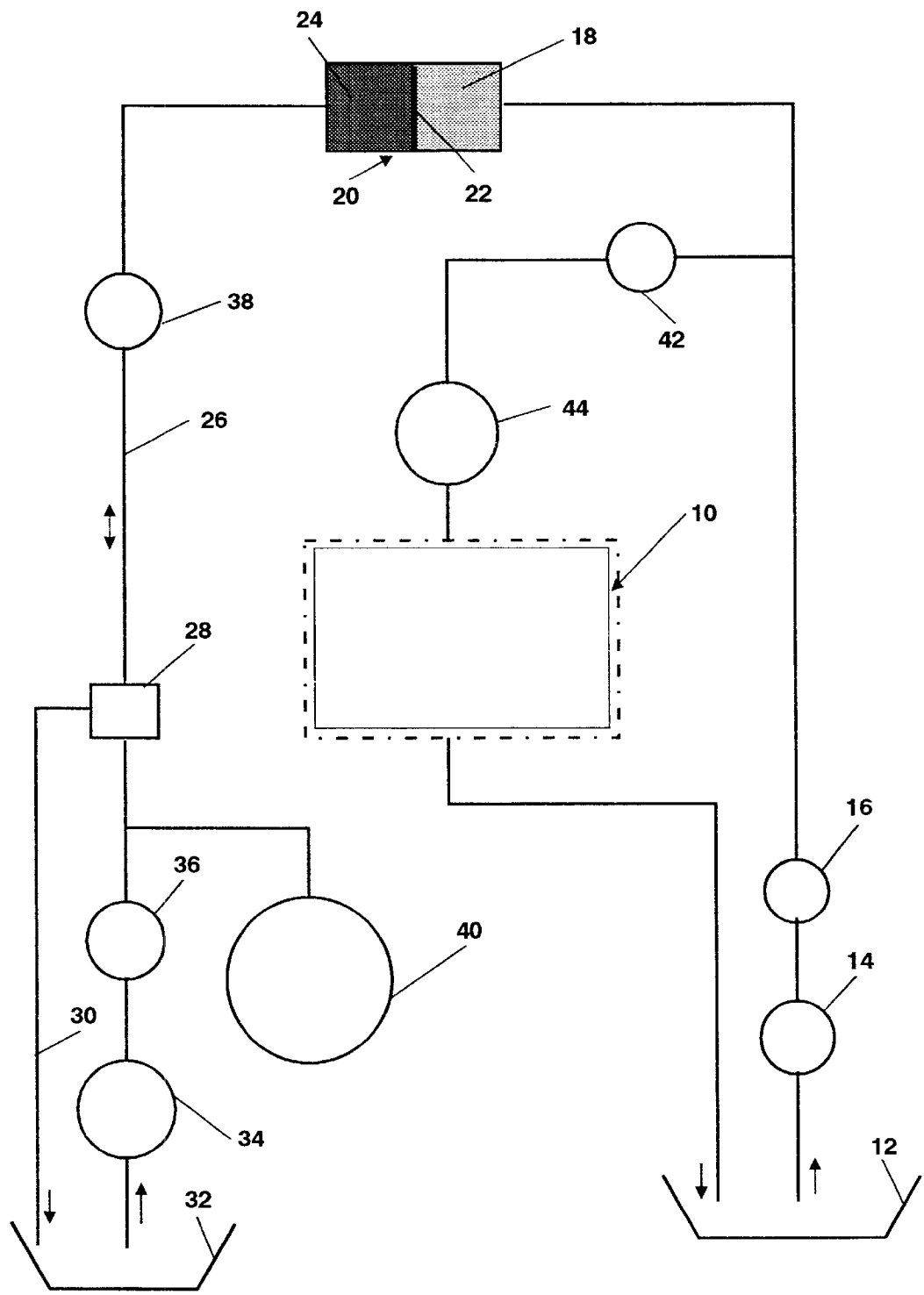

ELECTROCHEMICAL PROCESSING OF SUBJECTS FLOWN THROUGH BY AN ELECTROLYTE

FIELD AND BACKGROUND OF THE INVENTION

The invention relates to the electrochemical processing of passages in components such nozzles, by passing an electrolyte through the passages. A switched-off operating current is measured after the end of each work cycle of the process, to determine a throughput of the electrolyte. This is a calibration procedure of the invention and takes place at a constant high pressure. Processing ends when the throughput quantity is equal to a selected throughput of the electrolyte measured at the same high pressure or of an equivalent test fluid used in a sample component. The high pressure of the electrolyte is maintained using another fluid which, together with the quantity of electrolyte is sufficient for the calibration procedure. The electrolyte and the other fluid are located in a common pressure storage chamber.

Such a method is disclosed in EP B 0 802 009. The object of the known method is to produce a pulsation-free electrolyte flow which is under a pressure on the order of 100 bar, during the calibration of the flow channels in the component, and whose throughput is measured and compared to a nominal value obtained from a sample component.

An important field of application is e.g. the calibration of injection nozzles which are used in motor vehicle engines. It is expected that very high operating pressures of diesel oil will be injected from these nozzles, at a very narrow tolerated throughput. In the known method it is assumed that nozzles which have the same electrolyte throughput during the calibration procedures, in a later application correspond also with respect to the diesel oil throughput, wherein this approach in any case leads to good results when the flowing through of electrolyte during calibration is roughly under the same pressure as the diesel oil during later operation of a motor vehicle using the nozzles.

In WO 90/05039 it is further assumed that the pressure difference in the very narrow nozzle channels, thus the flow speed prevailing in these channels, only plays a minor role and for example the viscosity difference between the electrolyte and the operating fluid later flowing through the nozzle body, e.g. diesel oil, is considered to be more important.

Modern diesel motors which use the so-called common-rail principle, function at operating pressures of more than 1000 bar and the demands of accuracy on the injection nozzles of course grow with the increase of the operating pressures. The previously mentioned method at these operating pressures reaches it limit because it is technically difficult, perhaps even impossible to obtain gas control valves of a sufficient accuracy for pressure regions of a magnitude of 1000 bar. Also the compressing of the gaseous foreign fluid to this high pressure value demands a high technical expense. Furthermore the costs for the large-volumed gas storer play a very negative role.

SUMMARY OF THE INVENTION

It is the object of the invention to improve the known method to the extent that the calibration of auxiliary components with their electrochemical processing under an electrolyte pressure of far above 100 bar may be carried out and specifically with a structure which, with an acceptable technical expense, keeps the electrolyte pressure reproducibly constant.

In contrast to the previously mentioned state of the art the electrolyte quantity required for the calibration is delivered practically without pressure into the electrolyte compartment of the pressure chamber, while an equally large fluid quantity is displaced from the fluid compartment of the pressure chamber into a pressureless reservoir. After the fluid compartment and the electrolyte compartment of the pressure chamber are blocked with respect to the reservoir and the electrolyte tank, which on the electrolyte side may be effected e.g. by way of a return valve, a high pressure pump provides the pressure build-up in the fluid compartment of the pressure chamber. The pressure constancy in the fluid compartment may be maintained very precisely with a fluid high pressure regulator, which in the case of a gas pressure regulator—disregarding the incomparable high costs—would meet difficulties if one bears in mind the high pressures of the magnitude of 1000 bar. The electrolyte quantity exiting from the electrolyte compartment during the calibration must be continuously replaced with an equally large fluid quantity delivered by the fluid high pressure pump, which with a suitable design of the pump does not create any problems. The possible disadvantage with the method according to the invention, that pulsations are produced by the high pressure pump in the fluid compartment and are transmitted to the electrolyte, these then influencing the calibration procedure in a disturbing manner, in practice has surprisingly been shown to be unnoticeable, in particular when prior to the fluid compartment of the pressure storer there is connected a relatively large-volume damping buffer. It is essential that the pressure in the fluid compartment after completion of the calibration procedure is built up in that the outlet conduit to the reservoir is opened so that the new electrolyte quantity without pressure or at all events via a low counter-pressure can be delivered into the electrolyte compartment of the pressure chamber. The damping buffer however remains—with the exception of the pressure build-up phase in the fluid compartment—continuously under the high operating pressure and is also continuously connected to the high pressure pump, which demands a blocking of the high pressure pump delivery conduit together with the damping buffer from the fluid compartment of the pressure storer, when the fluid compartment is connected to the reservoir. This is possible by way of a simple reversing valve.

As a high pressure pump preferably a gear pump or a pump arrangement consisting of several gear pumps connected after one another is used. Alternatively it lies within the scope of the invention to use an axial piston pump as the high pressure pump. For the present invention it is important that, in the fluid compartment of the pressure chamber, there is achieved as slight a variation as possible over the time in the pressure.

A closed cylindrical container, roughly in the manner of a carbon dioxide cylinder, with a membrane incorporated to separate the fluid compartment from the electrolyte compartment has proven to be useful as a pressure chamber. Alternatively the pressure chamber can be a cylinder in which a piston is freely displaceable.

BRIEF DESCRIPTION OF THE DRAWINGS

The invention is described in more detail by way of an example illustrated in the drawing where the single FIGURE is a block diagram of the apparatus required for preparing a quantity of electrolyte under a high pressure for calibrating components according to the invention.

DESCRIPTION OF THE PREFERRED EMBODIMENTS

A so-called ecm region is indicated at 10, in which electrochemical processing of metallic components takes place. The components of this ecm-installation are known and are not described in more detail here. In a nozzle of a component to be calibrated, between a anode and a cathode of the ecm-installation, there is formed an operating gap through which flows an electrolyte. If, during a working cycle of the apparatus, a current flows in the operating gap to the component—e.g. a nozzle inlet, the material thickness at the inlet is reduced in order to produce an inlet curvature. By way of this processing the throughput resistance of the nozzle changes. This throughput is subsequently to be calibrated. For calibration, one compares the throughput quantity per unit time of the electrolyte in the just processed component, with that of the same electrolyte flowing in a sample component. The readings of the sample component are stored as nominal values which are obtained at a high pressure of, for example, 1000 bar. Correspondingly on calibration of the new component the same high pressure in the electrolyte is used. If the measured actual value of the electrolyte volume flowing through the component per unit time corresponds to the nominal value, the calibration is completed and experience shows that the throughput values of the sample component or nozzle and of the auxiliary or calibration component or nozzle with a later operational application, for example as an injection nozzle of a diesel engine, differ from one another within a very narrow tolerance range, although the operating medium, the diesel oil, has a different viscosity than the electrolyte used. Much more important than the viscosity as a comparative parameter is the agreement of the pressure values on calibration and in the later operational application.

The calibration proceeds as follows. Electrolyte fluid is pumped from a tank 12, by a low pressure pump 14 via a return valve 16, and is delivered into an electrolyte compartment 18 of a pressure chamber 20. The electrolyte in the pressure chamber 20 displaces a membrane or piston 22 which separates the electrolyte compartment 18 from another fluid compartment 24. The fluid located in the fluid compartment 24, e.g. an oil, is displaced through a fluid conduit 26, a reversing valve 28 and an overflow or emptying conduit 30 into a reservoir 32. As soon as in the electrolyte compartment 18 is filled, a quantity of the electrolyte which is sufficient for calibrating the component in unit 10 is supplied to the unit 10 as a result of the reversing valve 28 reversing and connecting the fluid compartment 24 to a high pressure pump 34 which pumps fluid from the reservoir 32 via a return valve 36, into the fluid compartment 24. This builds up a high pressure on the order of 1000 bar in compartment 24. The nominal high pressure is held constant at a tolerance range of +/−0.1 bar by way of a highly accurate control valve 38. In the direction of flow upstream of the reversing valve 28 from the fluid delivery conduit, there branches a conduit which leads to a large-volumed damping buffer 40 in which prevails a pressure above the nominal pressure of the fluid, since the damping buffer before reversing of the reversing valve 28, is charged by the high pressure pump 34. On reversing the reversing valve 28 from the emptying of the fluid compartment 24 to the filling thereof, the damping buffer 40 immediately effects a considerable pressure increase in the fluid compartment 24 so that the high pressure pump 34 must only run for a short time in order to reach the nominal pressure in the fluid compartment 24.

The calibration procedure may now begin. For this a valve 42 is opened and valve 16 is closed so that the electrolyte under a high pressure cause by membrane 22 pressing against the electrolyte in compartment 18, may flow from the electrolyte compartment 18 via a flow gauge 44 to the ecm unit or installation 10, where it flows through the nozzle of the component which is to be processed and subsequently flows back into the tank 12 via a return line. The throughput quantity per unit time is determined in the flow gauge or volumeter 44 and is subtracted from the nominal value. If the difference is larger than zero the next processing procedure takes place. After the throughput value has been measured in the volumeter 44, the valve 42 is closed and the operating cycle for filling the pressure chamber 20 with the electrolyte quantity for the next calibration procedure begins afresh.

What is claimed is:

1. A method for facilitating calibration of an electrochemical process for components which receive a flow of an electrolyte at a selected throughput per unit time during a working cycle in a processing unit (10) and which are subjected to an operating current measured during calibration at a constant high pressure, the process ending when the throughput is equal to a selected throughput, the method comprising:

providing a pressure chamber (20) having an electrolyte compartment (18) and a fluid compartment (24) separated from the electrolyte compartment by a movable membrane means (22);

providing an electrolyte tank (12) containing an electrolyte;

providing an pressure-less fluid reservoir (32) containing a fluid;

delivering a quantity of electrolyte from the electrolyte tank (12) at a low pressure to the electrolyte compartment (18) while simultaneously displacing a corresponding quantity of the fluid from the fluid compartment (24) into the reservoir (32);

valving off (16) the pressure chamber (20) with respect to the electrolyte tank (12);

building up a high pressure in the fluid compartment (24) by supplying fluid from the fluid reservoir (32) using a high pressure pump (34) via a highly accurate control valve (38) to exert the high pressure against the electrolyte in the electrolyte compartment (18) via the membrane means (22); and supplying a selected quantity of the electrolyte from the electrolyte compartment (18) to the electrochemical processing unit (10) under high pressure, by opening a connection (42) between the electrolyte compartment (18) and the electrochemical processing unit (10) to discharge electrolyte due to the exertion of the high pressure by the membrane means (22).

2. A method according to claim 1, wherein the high pressure pump (34) is provided to be a gear pump or multi-cylinder axial piston pump.

3. A method according to claim 1, including providing an electrolyte conduit leading from the electrolyte compartment (18) to the unit (10) and blocked off the conduit during a filling of the electrolyte compartment (18) and during the high pressure build-up in the fluid compartment (24).

4. A method for facilitating calibration of an electrochemical process for components which receive a flow of an electrolyte at a selected throughout per unit time during a working cycle in a processing unit (10) and which are subjected to an operating current measured during calibration at a constant high pressure, the process ending when the throughput is equal to a selected throughput, the method comprising:

providing a pressure chamber (20) having an electrolyte compartment (18) and a fluid compartment (24) separated from the electrolyte compartment by a freely displaceable piston (22);

providing an electrolyte tank (12) containing an electrolyte;

providing a pressure-less fluid reservoir (32) containing a fluid;

delivering a quantity of electrolyte from the electrolyte tank (12) at a low pressure to the electrolyte compartment (18) while simultaneously displacing a corresponding quantity of the fluid from the fluid compartment (24) into the reservoir (32);

valving off (16) the pressure chamber (20) with respect to the electrolyte tank (12);

building up a high pressure in the fluid compartment (24) by supplying fluid from the fluid reservoir (32) using a high pressure pump (34) via a highly accurate control valve (38) to exert the high pressure against the electrolyte in the electrolyte compartment (18) via the freely displaceable piston (22); and supplying a selected quantity of the electrolyte from the electrolyte compartment (18) to the electrochemical processing unit (10) under high pressure, by opening a connection (42) between the electrolyte compartment (18) and the electrochemical processing unit (10) to discharge electrolyte due to the exertion of the high pressure by the freely displaceable piston (22).

* * * * *